J. A. GILES.
NON-RECOIL GUN.
APPLICATION FILED OCT. 3, 1918.
1,394,490.
Patented Oct. 18, 1921.
6 SHEETS—SHEET 3.
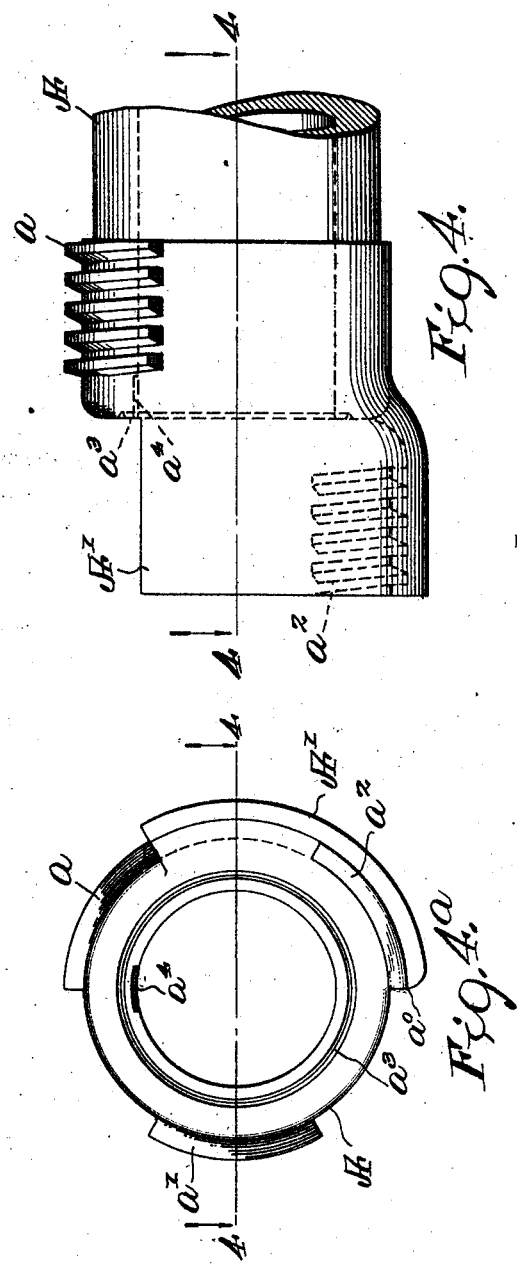
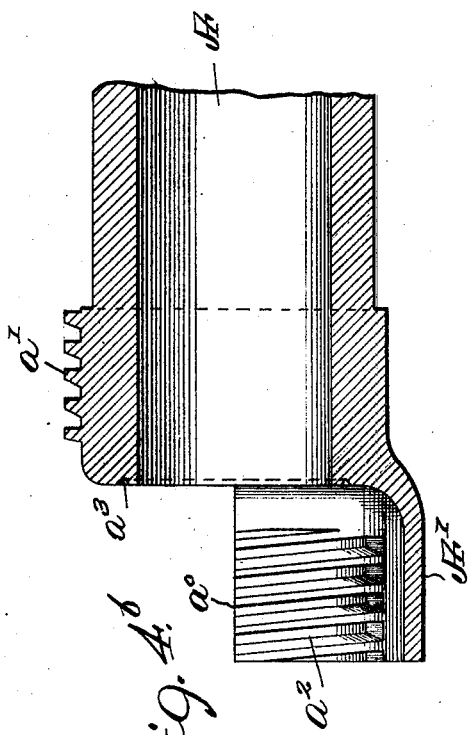
Witness
Edwin J Beller.
Inventor
J. A. Giles.
by Wilkinson & Giusta,
Attorneys.

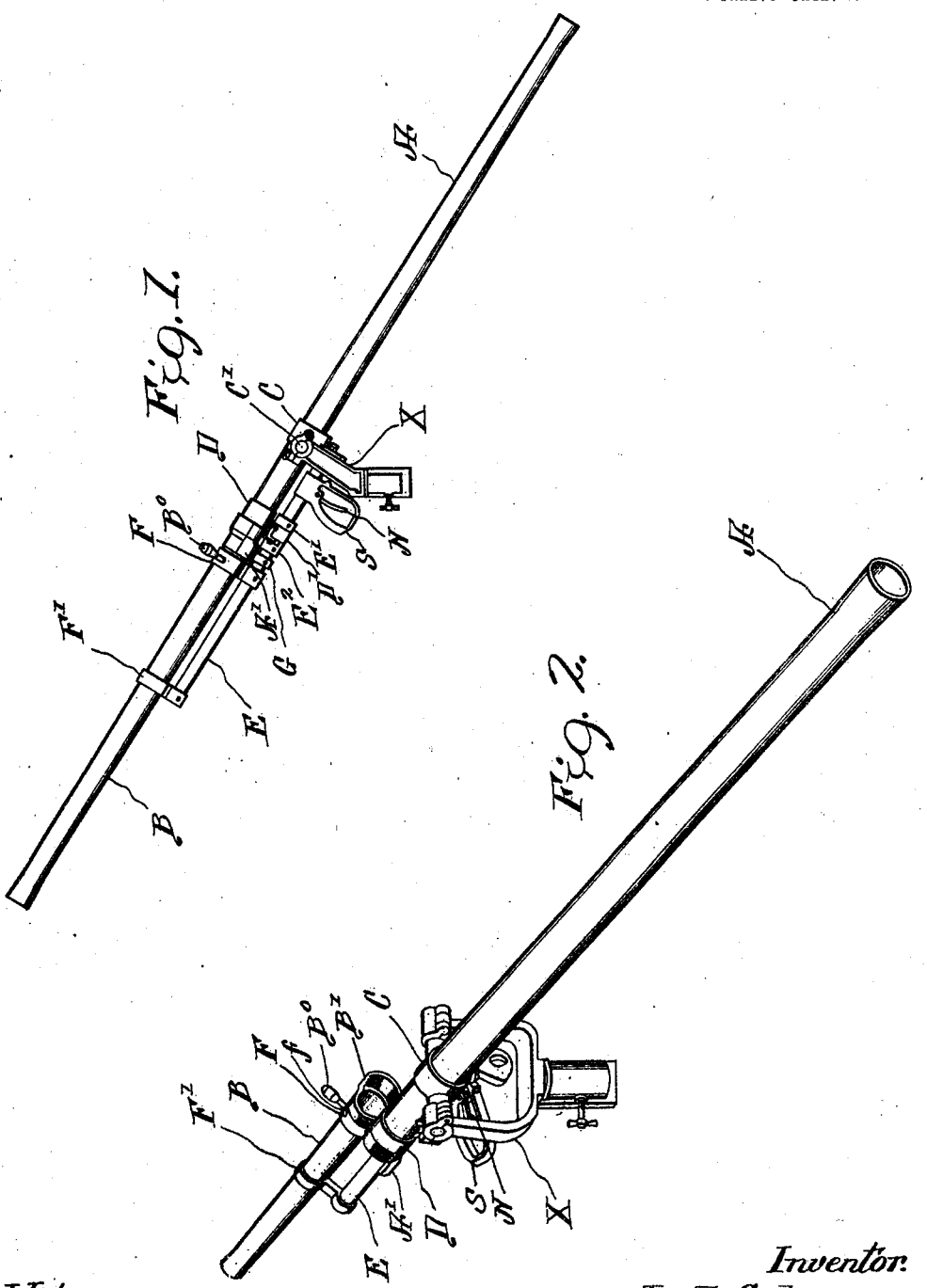

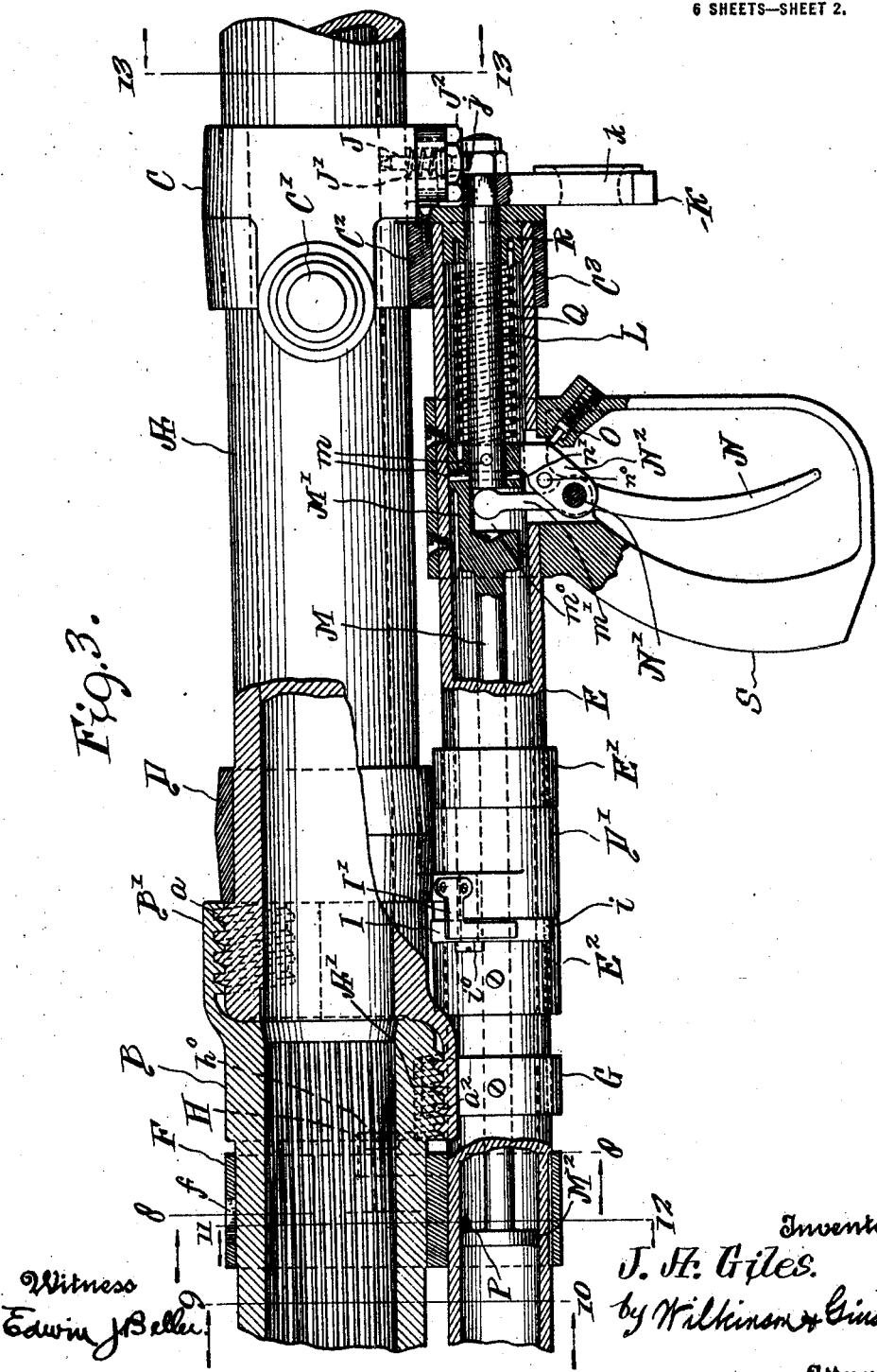

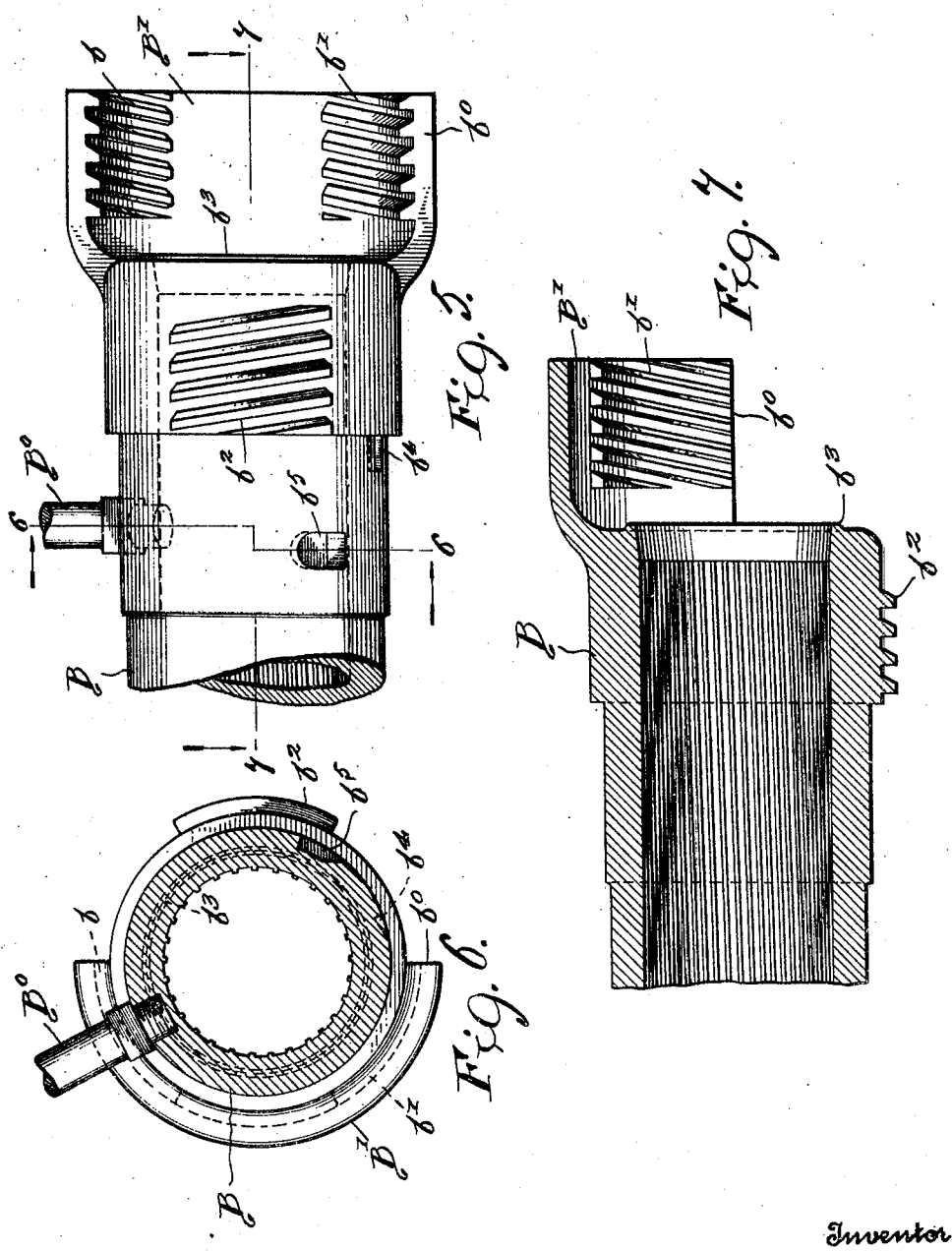

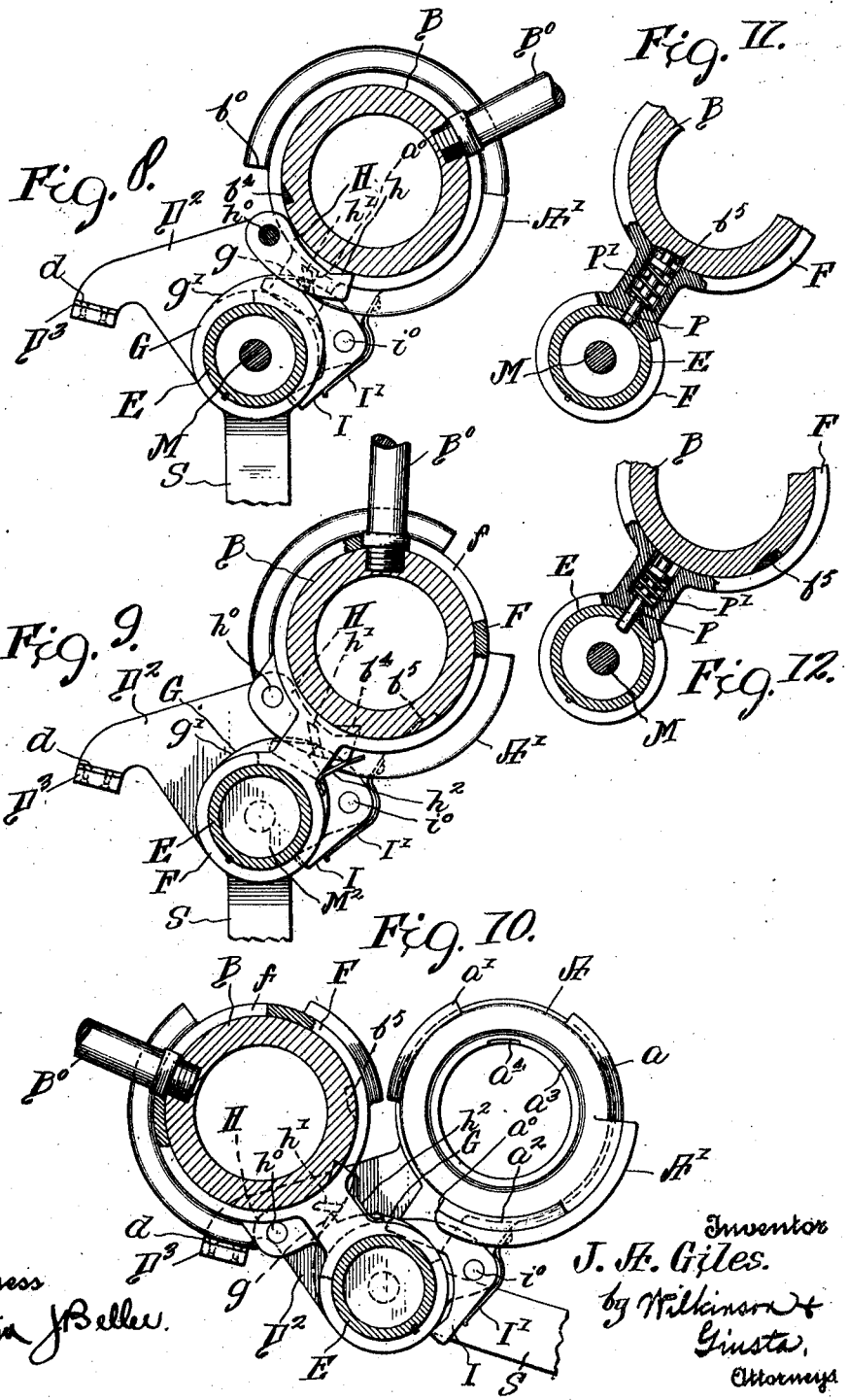

J. A. GILES.
NON-RECOIL GUN.
APPLICATION FILED OCT. 3, 1918.
1,394,490.
Patented Oct. 18, 1921.
6 SHEETS—SHEET 6.
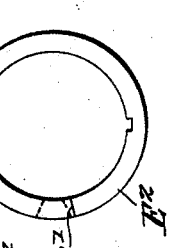
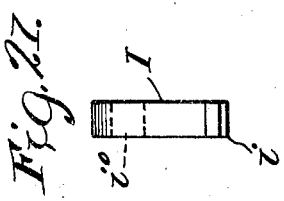
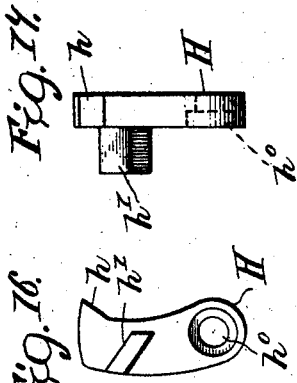
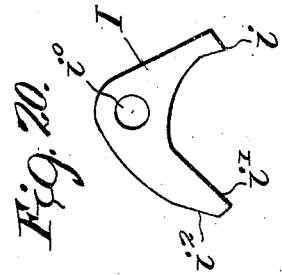
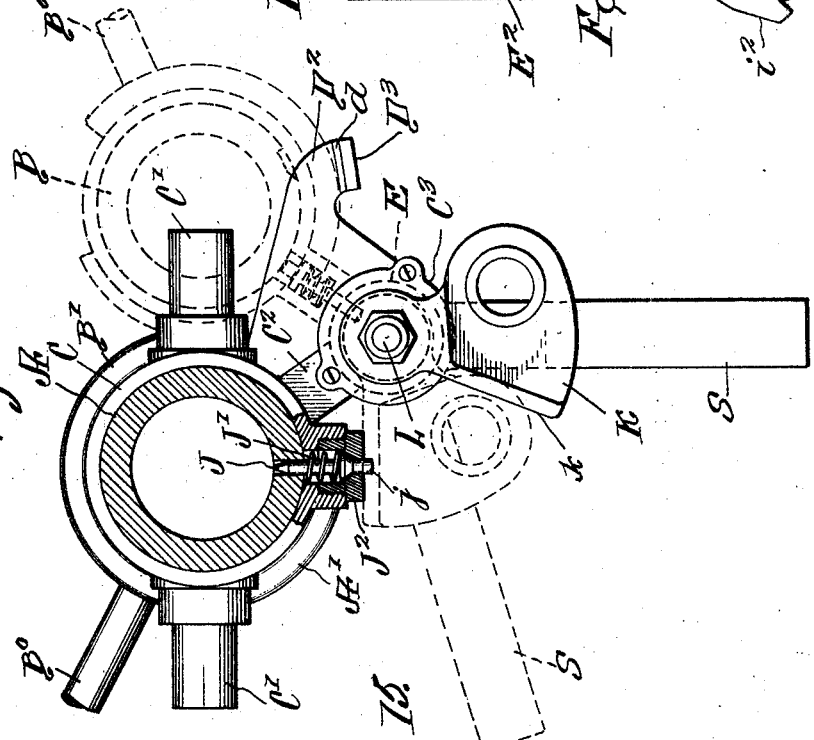
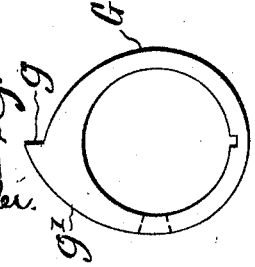
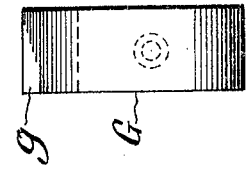
Inventor
J. A. Giles.
by Wilkinson &
Ginsta
Attorneys.
Witness
Edwin J Beller.

UNITED STATES PATENT OFFICE.

JULIAN A. GILES, OF DERBY, CONNECTICUT, ASSIGNOR TO THE GENERAL ORDNANCE CO., OF GROTON, CONNECTICUT, A CORPORATION OF CONNECTICUT.

NON-RECOIL GUN.

1,394,490. Specification of Letters Patent. Patented Oct. 18, 1921.

Application filed October 3, 1918. Serial No. 256,688.

*To all whom it may concern:*

Be it known that I, JULIAN A. GILES, a citizen of the United States, residing at Derby, in the county of New Haven and State of Connecticut, have invented certain new and useful Improvements in Non-Recoil Guns; and I do hereby declare the following to be a full, clear, and exact description of the invention, such as will enable others skilled in the art to which it appertains to make and use the same.

My present invention relates to improvements in a gun of the general type known in the art as the "Davis non recoil gun," such general type being illustrated and described in United States Letters Patent granted August 25, 1914 to Ordnance Development Co., assignee of Cleland Davis, No. 1,108,716, and entitled Apparatus for firing projectiles from aircraft.

The primary characteristic of this gun is the elimination of the recoil by the discharge of an inertia mass from the gun in the direction opposite to that in which the projectile proper is projected.

In the type of gun just referred to, there is a front and a rear barrel, the front barrel being journaled in trunnions, and the rear barrel being adapted to be locked to the front barrel by an interrupted screw engagement and to be unlocked and swung to one side of the front barrel when it is desired to load the gun.

The object of the present invention is to provide a simplified percussion firing mechanism combined with a one motion breech mechanism adapted for positive action and easy manipulation. This is especially desirable for the operation of said gun when used on air craft.

The invention is also especially intended to diminish the power necessary to swing the rear barrel of the gun from the open to the closed position and vice versa, to simplify the locking and unlocking of the rear barrel to the front barrel, to provide a positive safety lock for the firing mechanism, and to protect same against premature operation.

My invention will be more fully understood after reference to the accompanying drawings, in which similar parts are indicated by similar reference symbols throughout the several views, and in which:—

Figure 1 is a side elevation of the complete gun with the yoke supporting the trunnions, the rear barrel being interlocked with the front barrel.

Fig. 2 is a perspective view of the same gun, but on a larger scale, showing the rear barrel swung aside to the loading position.

Fig. 3 is a side elevation, on a still larger scale, of the central portion of the gun with the two barrels locked, and with the firing mechanism in the cocked position, parts being broken away.

Fig. 4 shows a side elevation of the breech end of the front barrel.

Fig. 4ª shows a rear elevation of the front barrel.

Fig. 4ᵇ shows a horizontal section through the front barrel along the line 4—4 of Figs. 4 and 4ª.

Fig. 5 shows a side elevation of the forward end of the rear barrel.

Fig. 6 shows a section through the rear barrel along the line 6—6 of Fig. 5, and looking in the direction of the arrows.

Fig. 7 shows a horizontal section through the rear barrel along the line 7—7 of Fig. 5.

Fig. 8 shows a section along the broken line 8—8 of Fig. 3, and looking in the direction of the arrows, the two barrels being in the locked position and the firing mechanism being in the cocked position as shown in Fig. 1.

Fig. 9 shows a section along the line 9—10 of Fig. 3, and looking in the direction of the arrows, but with the two barrels in alinement and unlocked, the operating handle having been swung to the vertical position from the locked position shown in Fig. 8.

Fig. 10 is a similar section to Fig. 9, except that the rear barrel has been swung clear of the front barrel and rests on the supporting stop, the breech now being open for loading.

Figs. 11 and 12 show sections along the line 11—12 of Fig. 3, looking in the direction of the arrows, and illustrate the automatic action of the safety pin for locking and releasing the firing mechanism.

Fig. 13 shows a section along the line 13—13 of Fig. 3, but with part of the trunnion band broken away to show the firing pin and its retraction spring.

Figs. 14 and 15 are details showing in end view and side elevation the cam coacting with the rear barrel lock.

Figs. 16 and 17 show in side elevation and end view the rear barrel lock which prevents the rear barrel from turning in the guide band when the two barrels are disengaged.

Figs. 18 and 19 show in side elevation and end view the collar on the operating shaft which coacts with the shaft lock; and Figs. 20 and 21 show in side elevation and end view the shaft lock.

The gun is designed to fire fixed ammunition of the character described in the pending application of Lawrence Y. Spear and Gregory C. Davison, entitled Fixed ammunition for non-recoil guns, filed May 25, 1918, Serial No. 236558.

The gun consists primarily of a forward barrel A and a rear barrel B, which are connected together by interrupted screw threads, as will be hereinafter described.

The forward barrel is secured in the trunnion band C carrying the trunnions C' journaled in the yoke X supported on the gun mount not shown. The gun mount, not being a part of my present invention, will not be further described herein.

The forward gun barrel carries near its breech a fixed band D, known as the breech band, which has a downwardly and laterally projecting arm D' serving as a journal bearing for the main operating shaft E which is preferably in the form of a hollow cylinder, and has its forward end journaled in the bearing $C^3$ carried by the arm $C^2$, projecting downwardly and laterally from the trunnion band; thus the operating shaft is mounted below and at one side of the upper gun barrel, as shown in Figs. 8 to 13.

On the opposite side of the fixed breech band D, from the arm D', said band is provided with a downwardly and laterally projecting bracket $D^2$, see Figs. 8 to 10 and 13, which bracket carries a stop $D^3$ preferably faced with yielding material $d$, such as rubber, by which the swinging motion of the rear gun barrel is arrested when opening the breech of the gun.

The rear gun barrel is rotatably mounted in guide bands F and F' which are fast to the operating shaft, as shown in Figs. 1, 2 and 3.

The guide band F is provided with a slot $f$ through which projects the handle $B^6$ fast to the rear barrel B. This slot $f$ is inclined corresponding to the pitch of the screw threads, by means of which screw threads the two barrels are locked together, so that the handle will move slightly rearward relative to the band F in opening the breech and vice versa in closing the breech.

The operating shaft E is held against longitudinal motion in any convenient way, as by the set collars E' and $E^2$. The interlocking arrangement, by means of which the front and rear barrels are secured together and released when desired, is shown in Figs. 4 to 7, in which Figs. 4 to $4^b$ illustrate the construction of the rear end of the front barrel, and Figs. 5 to 7 illustrate the construction of the forward end of the rear barrel.

Referring to Figs. 4 to $4^b$, the front barrel is provided with external screw threads $a$ and $a'$ near the top thereof, and with a rearwardly projecting segmental sleeve A', in which are provided internal screw threads $a^2$. The rear face of the barrel is also provided with an annular groove $a^3$, forming part of the gas check, and also with a notch $a^4$ to serve as a guide in centering the projectile in the gun, as described in the application of Spear and Davison aforesaid.

Referring now to Figs. 5 to 7, the rear barrel B is shown as provided with external segmental screw threads $b^2$, adapted to engage the internal screw threads $a^2$ on the segmental sleeve A' of the front barrel A, and is also provided with a segmental sleeve B' having internal screw threads $b$ and $b'$ adapted to engage the external screw threads $a$ and $a'$ on the front barrel when the two barrels are in the locked position.

The forward face of the rear barrel is also provided with an annular rib $b^3$ adapted to project into the V-shaped annular groove $a^3$ in the front barrel and form therewith a gas check when the breech is closed and locked.

The rear barrel is also provided with a notch $b^4$ for the rear barrel lock, and with a notch $b^5$ for the safety pin of the firing mechanism. The rear barrel is also provided with a handle $B^6$, by turning which handle the breech may be opened and closed as will be hereinafter described.

It will be noted that the front barrel is fixed in the trunnion band, while the rear barrel must be rotated to lock or unlock the same, and must be swung about the axis of the operating shaft for opening or closing the breech, and it has been found in practice necessary, for the efficient operation of the parts, that the rotary locking or unlocking motion of the rear barrel shall be effected while the said barrel is locked against swinging laterally about the axis of the operating shaft.

It becomes desirable, therefore, in opening the breech to lock the shaft against turning until the screw threads of the breech are completely disengaged before any swinging motion can be effected, and in closing the breech it is essential to lock the rear barrel against turning in the guide bands, so that the screw threads may be swung back to the proper position for engagement before the rotary motion of the rear barrel in closing the breech has begun. These two results are automatically accomplished incident to the opening and closing of the breech by the mechanism shown in Figs. 8 to 10 and 14 to 21.

The cam G, see Figs. 8 to 10 and 14–15, is provided with a cam face $g'$ and a locking shoulder $g$, and this cam is fast on the operating shaft E. When the front and rear barrels are in line, the shoulder $g$ engages the edge of the axial shoulder $a^0$ on the rearward projection A' of the forward barrel A, see also Figs. 8 to 10 and 4 to 4$^b$. This will stop the rear barrel when it is swung upward into alinement with the front barrel, and, preventing any swinging movement of the rear barrel, will permit the said barrel to be rotated about its axis. This cam G, therefore, acts as a stop or lock for the rear barrel when it is brought into axial alinement with the front barrel.

H represents a dog, which is pivoted, as at $h^0$, to the guide band F, and is provided with a pawl end $h$ adapted to engage in the notch $b^4$ in the rear barrel, see Figs. 8 to 10 and 16–17.

This dog is normally pressed toward said barrel by means of the spring $h^2$, and the said dog is provided with a laterally projecting cam arm $h'$, which is adapted to engage the shoulder $a^0$ on the forward barrel just before the rear barrel is swung into alinement with the forward barrel; and thus the rear barrel will be held against turning in the band F except when the two barrels are in alinement in the operation of closing the breech.

I, see Figs. 8 to 10 and 20–21, indicates a latch in the form of a bell crank lever pivoted as at $i^0$ to the breech band D, which is provided with a pawl arm $i$, and with its oppositely disposed arm $i'$ having a cam face $i^2$. The pawl $i$ is normally pressed in toward the band E$^2$ by means of the spring I' so that when the forward and rear barrels are in the locked position, the pawl $i$ will be snapped into the slot $e$ and engage the shoulder $e'$ of the band E$^2$, as shown in Figs. 8 to 10 and 18, and will hold the rear band from being swung laterally about the axis of the operating shaft E.

As the rear barrel is turned from the locked position, see Fig. 8, to the unlocked position, see Fig. 9, the shoulder $b^0$ will strike the cam face $i^2$ on the bell crank lever I, and will swing the pawl $i$ out of engagement with the shoulder $e'$, and the operating shaft will then be free to swing the guide bands F and F' and with them the rear barrel.

It will be seen that, the rear barrel being free to rotate in the bands F and F', a condition might arise where the bearing surfaces on the rear barrel, engaged in these two guide bands, would be fouled or corroded. In this event, assuming the breech to be locked, when a pressure is applied to the operating handle, instead of turning the rear barrel in the guide bands the operator would tend to swing the barrel about the axis of the main shaft. This action would tend to wedge the threads in the breech tighter together, and therefore this latch I prevents any swinging of the rear barrel about the operating shaft until the threads of the front and rear barrels are disengaged.

The firing mechanism comprises a firing pin J, normally pressed backward against engagement with the primer by the spring J', which firing pin has an annular shoulder engaging in the cup washer J$^2$, see Fig. 3.

The head $j$ of the firing pin projects outward, and is normally clear of the hammer K, as shown in Fig. 3. When the gun is loaded, and the firing mechanism is operated, the head of the firing pin is struck by the hammer K, as will be hereinafter described.

The hammer K has a surface $k$ adapted to strike the firing pin when the gun is fired, and this hammer is in the form of a segment fast on the spindle L, which is attached to the head M' of the reciprocating rod M in any convenient way, as by means of the tapered pins $m$; these pins being preferably tapered for convenience of assembly.

This rod M is provided with a head M' which has a recess $m^0$ for the arm $m'$ projecting upwardly from the trigger N, which is fast on the trigger shaft N' carrying the sear N$^2$, which sear is normally pressed backward by means of the spring plunger O.

This trigger shaft N' is journaled in the trigger guard S, which is fast to the main operating shaft E, and as said shaft rotates this trigger cap also rotates.

The rod M is provided with a rear head M$^2$, sliding freely in the bore of the main operating shaft E.

P represents a safety stop normally pressed inward into the hammer chamber in said shaft E, by engagement with the outer face of the barrel B, this pin engaging the head M$^2$ and locking the rod M in the safety position as shown in Fig. 3; but when the notch $b^5$, see Figs. 11 and 12, of the rear barrel B registers with the inner end of this stop P, as shown in Fig. 11, the spring P' will withdraw said stop from engagement with the head M$^2$ on the rod M, and the firing mechanism is then free to be operated.

Q, see Fig. 3, represents a torsional spring, which is held under compression and under torsion between the head M' of the rod M, and the fixed head R which is attached to the part C$^2$ of the trunnion band C. The tendency of this spring is to rotate the spindle L about its axis and also to press the head M' backward.

The sear N$^2$ normally projects into the axial groove $n'$ in the head M' and holds the spindle L against rotation by the spring Q, while the arm $m'$ and the sear N$^2$ form a crotch engaging the head M', and coacting to lock the head M' against rearward movement.

Now, when the rear barrel has been turned to the closed and locked position, the lock P being then projecting into the notch $b^5$, and being clear of the head $M^2$, if the trigger N be pulled rearward the arm $m'$ will press the spindle L forward, moving the hammer K in the wake of the firing pin J.

The complete rearward movement of the trigger will release the sear $N^2$ from engagement with the notch $n'$, and the spring Q will immediately rotate the spindle L and the rod M and the parts carried thereby, including the hammer K, causing the surface $k$ of the hammer K to strike the head $j$ of the firing pin and to fire the cartridge.

The parts L and M when connected together by the pins $m$, form in effect one rod and move together axially; the rearward movement of this rod being further prevented when the hammer K strikes the bushing R, see Fig. 3.

This bushing R is rigidly attached to the trunnion band and therefore cannot revolve. The trigger N with its extension $m'$ is preferably in one piece and both rock together about the pin $N'$. This arm $m'$ has a limited play in the slot $m^0$ and thus a limited play is also imparted to the trigger N.

The sear $N^2$ is provided with a transverse stop pin $n^0$ which is normally clear of the arm $m'$, but engages said arm when the trigger N is drawn backward. When the trigger N is pulled by hand to the rear, the bar L with the extension M moves forward until the hammer K is nearly central from the firing pin J. As the rod L moves forward the arm $m'$ will strike the stop pin $n^0$, rocking the sear $N^2$ about the pin $N'$ against the action of the spring plunger O, and the parts are so arranged that when the sear $N^2$ is moved out of engagement with the notch $n'$, the hammer K will be in the firing position and the spring Q will rotate the rod L, causing the hammer to strike the firing pin. Upon releasing the trigger N the spring Q forces the rods L and M backward, leaving the engaging face of the sear riding on the outer circumference of the head $M'$; the arm $m'$ being rocked backward at the same time, and the trigger being rocked forward under the action of the spring Q.

As the rods L and M move backward, the head $M^2$ passes in rear of the safety pin P.

When the rear barrel is swung laterally, as for opening the breech, the hollow shaft E is rotated, causing the spring Q to wind up, as one end of this spring is secured to the trunnion band C, and the other end is secured to the head $M'$.

The sear $N^2$ rides over the rounded face of the head $M'$ until when the shaft is rotated far enough this sear will snap into the notch $n'$ under the action of the spring plunger O. The trigger N and sear $N^2$ are both journaled side by side on the same pin $N'$, but are independently movable, the sear being normally held in engagement with the head $M'$ by means of the spring plunger O.

As the rear barrel is swung back into alinement with the front barrel and the screw threads are interlocked, the spring Q will still remain under torsion, and the firing mechanism will remain cocked; but the actual firing cannot be effected until the rear barrel is firmly locked to the forward barrel, or, in other words, until the spring plunger P projects into the notch $b^5$ of the rear barrel as shown in Fig. 11.

It will thus be seen that I provide a mechanism for use with non recoil guns, in which the forward barrel is permanently held in the trunnion bands, and in which the rear barrel is firmly locked against any tendency to swing laterally until the screw threads on the front and rear barrels are disengaged, and in which the rear barrel is firmly held on its carrier during the swinging out and swinging in movements; and in which at the end of the swinging in movement the rear barrel is firmly held against further swinging movement while the screw threads on the forward and rear barrels are being locked.

Thus it will be seen that I provide a breech mechanism for non recoil guns having two open-ended barrels, one fixed in the trunnion band and the other detachably connected thereto, in which the opening of the breech of the forward barrel is effected by a single continuous movement of a handle, and the closing of the breech of the forward barrel is effected by the reverse movement of said handle.

It will be further seen that I provide an absolutely safe firing mechanism which cannot be operated except when the forward and rear barrels have their screw threads securely interlocked, and in which the mechanism is automatically cocked incident to the operation of closing the breech of the gun; but in which the firing pin cannot be accidentally operated unless all the parts are in the safety position, and not then until the trigger is pulled.

It will be noted that the action of the firing pin spring $J'$ is not to cause the firing pin to strike the primer, but to withdraw the firing pin from the primer, and even if this spring should fail to act from any cause, there would be no danger from premature explosion of the primer by the firing pin.

This mechanism is constructed with the center line of the operating shaft offset or out of line to the right to accommodate the firing mechanism herein described and allow the firing pin to be directly beneath the gun.

This offsetting of the shaft also is an improvement over the previous types of non-recoil guns with the shaft vertically beneath the rear barrel when locked, as the movement necessary to unlock and open the gun does not bring the rear barrel into horizontal position in relation to the rotating shaft and thus the force necessary to swing the rear barrel to the position for closing the breech is much less.

While I have shown the gun barrel with a smooth bore, and that would be a desirable construction because lighter barrels could be used than if the barrel were rifled, still the gun may be rifled if desired; in which case it would preferably have the rear portion of the barrel also rifled, with similar rifling rearward of the powder chamber to that forward of the same, and a counterweight should preferably be used adapted to take a rifling band, so that the twisting effect of the rifling on the gunmount might be neutralized. The twisting of the two projectiles in opposite directions would cause two equal and opposite forces to neutralize any rotary movement of the gun about its axis. With a very light gun on a very light platform, this rotary force if unbalanced might result in accidents, which would not be likely to occur with an ordinary gun on an ordinary mount.

With both barrels rifled in the proper direction, it will be noted that the reaction of the projectile and recoil case will tend to lock the screw threads of the two barrels more securely together and to keep the gun closed and the gas check tightly sealed.

It will be noted that this mount and the gun platform are not affected by the shock of recoil, and they need only be of sufficient strength to support the weights carried.

These and the various other advantages of the herein described construction will be obvious to those skilled in the art.

It will be obvious that various modifications might be made in the herein described apparatus, and in the construction, combination and arrangement of parts which could be used without departing from the spirit of my invention; and I do not mean to limit the invention to such details except as particularly pointed out in the claims.

Having thus described my invention, what I claim and desire to secure by Letters Patent of the United States is:—

1. In a non recoil gun of the character described, the combination with a trunnion band, and a forward barrel held therein, said forward barrel being provided with segmental screw threads on the exterior of its rear end and with a rearwardly projecting segment having internal segmental screw threads therein, of a rear barrel having external segmental screw threads engaging said internal screw threads on the rearwardly projecting segment of the forward barrel, and having a forwardly projecting segment provided with internal segmental screw threads engaging the external segmental screw threads on the forward barrel, with means for turning said rear barrel about its axis for locking and unlocking said coacting screw threads, and for swinging said rear barrel laterally to clear said front barrel, substantially as described.

2. In a non recoil gun of the character described, the combination with a trunnion band, and a forward barrel held therein, said forward barrel being provided with segmental screw threads on the exterior of its rear end and with a rearwardly projecting segment having internal segmental screw threads therein, of a rear barrel having external segmental screw threads engaging said internal screw threads on the rearwardly projecting segment of the forward barrel, and having a forwardly projecting segment provided with internal segmental screw threads engaging the external segmental screw threads on the forward barrel, with a handle secured to said rear barrel for turning said rear barrel about its axis for locking and unlocking said coacting screw threads, and means controlled by said handle for swinging said rear barrel laterally to clear said front barrel.

3. In a non recoil gun of the character described, the combination with a trunnion band, and a forward barrel held therein, said forward barrel being provided with segmental screw threads on the exterior of its rear end and with a rearwardly projecting segment having internal segmental screw threads therein, of a rear barrel having external segmental screw threads engaging said internal screw threads on the rearwardly projecting segment of the forward barrel, and having a forwardly projecting segment provided with internal segmental screw threads engaging the external segmental screw threads on the forward barrel, a main operating shaft journaled in bearings carried by said forward barrel, guide bands loosely fitting said rear barrel and secured fast to said operating shaft, with means for turning said rear barrel in said guide bands about its axis for locking and unlocking said coacting screw threads, and for swinging said rear barrel laterally to clear said front barrel, substantially as described.

4. In a non recoil gun of the character described, the combination with a trunnion band, and a forward barrel held therein, said forward barrel being provided with segmental screw threads on the exterior of its rear end and with a rearwardly projecting segment having internal segmental screw threads therein, of a rear barrel having external segmental screw threads engaging said internal screw threads on the rearwardly projecting segment of the forward barrel, and having a forwardly projecting segment provided with internal segmental screw threads engaging the external segmental screw threads on the forward barrel, a main operating shaft journaled in bearings carried by said forward barrel, guide bands loosely fitting said rear barrel and secured fast to said operating shaft, with a handle for turning said rear barrel in said guide bands about its axis for locking and unlocking said coacting screw threads, and for swinging said operating shaft and with it said rear barrel to clear said front barrel, substantially as described.

5. In a non recoil gun of the character described, the combination with a trunnion band, and a forward barrel held therein, said forward barrel being provided with segmental screw threads on the exterior of its rear end and with a rearwardly projecting segment having internal segmental screw threads therein, of a rear barrel having external segmental screw threads engaging said internal screw threads on the rearwardly projecting segment of the forward barrel, and having a forwardly projecting segment provided with internal segmental screw threads engaging the external segmental screw threads on the forward barrel, a main operating shaft journaled in bearings carried by said forward barrel, guide bands loosely fitting said rear barrel and secured fast to said operating shaft, one of said guide bands being provided with a cam slot corresponding to the pitch of said screw threads, with a handle secured to said rear barrel and engaging in said cam slot for turning said rear barrel in said guide bands about its axis for locking and unlocking said coacting screw threads, and for swinging said operating shaft and with it said rear barrel to clear said front barrel, substantially as described.

6. In a non recoil gun of the character described, the combination with a trunnion band, and a forward barrel held therein, said forward barrel being provided with segmental screw threads on the exterior of its rear end and with a rearwardly projecting segment having internal segmental screw threads therein, of a rear barrel having external segmental screw threads engaging said internal screw threads on the rearwardly projecting segment of the forward barrel, and having a forwardly projecting segment provided with internal segmental screw threads engaging the external segmental screw threads on the forward barrel, a main operating shaft journaled in bearings carried by said forward barrel and located at one side of and below said forward barrel, guide bands loosely fitting said rear barrel and secured fast to said operating shaft, with a handle for turning said rear barrel in said guide bands about its axis for locking and unlocking said coacting screw threads, and for swinging said operating shaft and with it said rear barrel to clear said front barrel, with a stop supported from said forward barrel and limiting the outward swing of said rear barrel, substantially as described.

7. In a non recoil gun of the character described, the combination with a trunnion band, and a forward barrel held therein, said forward barrel being provided with segmental screw threads on the exterior of its rear end and with a rearwardly projecting segment having internal segmental screw threads therein, of a rear barrel having external segmental screw threads engaging said internal screw threads on the rearwardly projecting segment of the forward barrel, and having a forwardly projecting segment provided with internal segmental screw threads engaging the external segmental screw threads on the forward barrel, a main operating shaft journaled in bearings carried by said forward barrel and located at one side of and below said forward barrel, guide bands loosely fitting said rear barrel and secured fast to said operating shaft, one of said guide bands being provided with a cam slot corresponding to the pitch of said screw threads, with a handle secured to said rear barrel and engaging in said cam slot for turning said rear barrel in said guide bands about its axis for locking and unlocking said coacting screw threads, and for swinging said operating shaft and with it said rear barrel to clear said front barrel, with a stop supported from said forward barrel and limiting the outward swing of said rear barrel, substantially as described.

8. In a non recoil gun of the character described, the combination with a trunnion band, and a forward barrel held therein, said forward barrel being provided with segmental screw threads on the exterior of its rear end and with a rearwardly projecting segment having internal segmental screw threads therein, of a rear barrel having external segmental screw threads engaging said internal screw threads on the rearwardly projecting segment of the forward barrel, and having a forwardly projecting segment provided with internal segmental screw threads engaging the external segmental screw threads on the forward barrel, and one of said barrels having a V-shaped annular groove, and the other having an annular rib to engage in said groove, on their abutting faces, thereby forming a gas check, with means for turning said rear barrel about its axis for locking and unlocking said coacting screw threads, and for swinging said rear barrel laterally to clear said front barrel, substantially as described.

9. In a non recoil gun, of the character described, the combination with a trunnion band, and a forward barrel held therein, said forward barrel being provided with segmental screw threads on the exterior of its rear end and with a rearwardly projecting segment having internal segmental screw threads therein, of a rear barrel having external segmental screw threads engaging said internal screw threads on the rearwardly projecting segment of the forward barrel, and having a forwardly projecting segment provided with internal segmental screw threads engaging the external segmental screw threads on the forward barrel, and one of said barrels having a V-shaped annular groove, and the other having an annular rib to engage in said groove, on their abutting faces, thereby forming a gas check, with a handle secured to said rear barrel for turning said rear barrel about its axis for locking and unlocking said coacting screw threads, and means controlled by said handle for swinging said rear barrel laterally to clear said front barrel.

10. In a non recoil gun of the character described, the combination with a trunnion band, and a forward barrel held therein, said forward barrel being provided with segmental screw threads thereon, of a rear barrel having segmental screw threads engaging the segmental screw threads on the forward barrel, a main operating shaft journaled in bearings carried by said forward barrel, guide bands loosely fitting said rear barrel and secured fast to said operating shaft, means for turning said rear barrel in said guide bands about its axis for locking and unlocking said coacting screw threads, and for swinging said operating shaft and with it said rear barrel to clear said front barrel, means for automatically holding the rear barrel against rotating in the guide bands while the breech is open, and until the screw threads are in alinement in the operation of closing the breech, means for automatically stopping the swinging movement of the rear barrel when the front and rear barrels are in axial alinement in the operation of closing the breech, and means for automatically locking the operating shaft against rotation until the screw threads of the two barrels are completely disengaged in the operation of opening the breech.

11. In a non recoil gun of the character described, the combination with a trunnion band, and a forward barrel held therein, said forward barrel being provided with segmental screw threads thereon, of a rear barrel having segmental screw threads engaging the segmental screw threads on the forward barrel, a main operating shaft journaled in bearings carried by said forward barrel, guide bands loosely fitting said rear barrel and secured fast to said operating shaft, means for turning said rear barrel in said guide bands about its axis for locking and unlocking said coacting screw threads, and for swinging said operating shaft and with it said rear barrel to clear said front barrel, a spring impressed dog provided with a tripping arm for automatically holding the rear barrel against rotation in the guide bands while the breech is open, and until the screw threads are in alinement in the operation of closing the breech, means for automatically stopping the swinging movement of the rear barrel when the front and rear barrels are in axial alinement in the operation of closing the breech, and means for automatically locking the operating shaft against rotation until the screw threads of the two barrels are completely disengaged in the operation of opening the breech.

12. In a non recoil gun of the character described, the combination with a trunnion band, and a forward barrel held therein, said forward barrel being provided with segmental screw threads thereon, of a rear barrel having segmental screw threads engaging the segmental screw threads on the forward barrel, a main operating shaft journaled in bearings carried by said forward barrel, guide bands loosely fitting said rear barrel and secured fast to said operating shaft, means for turning said rear barrel in said guide bands about its axis for locking and unlocking said coacting screw threads, and for swinging said operating shaft and with it said rear barrel to clear said front barrel, means for automatically holding the rear barrel against rotation in the guide bands while the breech is open, and until the screw threads are in alinement in the operation of closing the breech, a cam carried by said operating shaft provided with a shoulder adapted to engage the forward barrel of the gun for automatically stopping the swinging movement of the rear barrel when the front and rear barrels are in axial alinement in the operation of closing the breech, and means for automatically locking the operating shaft against rotation until the screw threads of the two barrels are completely disengaged in the operation of opening the breech.

13. In a non recoil gun of the character described, the combination with a trunnion band, and a forward barrel held therein, said forward barrel being provided with segmental screw threads thereon, of a rear barrel having segmental screw threads engaging the segmental screw threads on the forward barrel, a main operating shaft journaled in bearings carried by said forward barrel, guide bands loosely fitting said rear barrel and secured fast to said operating shaft, means for turning said rear barrel in said guide bands about its axis for locking and unlocking said coacting screw threads, and for swinging said operating shaft and with it said rear barrel to clear said front barrel, means for automatically holding the rear barrel against rotation in the guide bands while the breech is open, and until the screw threads are in alinement in the operation of closing the breech, means for automatically stopping the swinging movement of the rear barrel when the front and rear barrels are in axial alinement in the operation of closing the breech, and means for automatically locking the operating shaft against rotation until the screw threads of the two barrels are completely disengaged in the operation of opening the breech, comprising a slotted collar fast on said operating shaft, and a spring impressed bell crank lever pivoted to the front barrel and having a pawl arm adapted to project into said slot and lock said collar against turning, and a releasing arm adapted to engage the rear barrel of the gun when the two barrels are in alinement, and the screw threads disengaged.

14. In a non recoil gun of the character described, the combination with a trunnion band, and a forward barrel held therein, said forward barrel being provided with segmental screw threads thereon, of a rear barrel having segmental screw threads engaging the segmental screw threads on the forward barrel, a main operating shaft journaled in bearings carried by said forward barrel, guide bands loosely fitting said rear barrel and secured fast to said operating shaft, means for turning said rear barrel in said guide bands about its axis for locking and unlocking said coacting screw threads and for swinging said operating shaft and with it said rear barrel to clear said front barrel, a spring impressed dog provided with a tripping arm for automatically holding the rear barrel against rotation in the guide bands while the breech is open, and until the screw threads are in alinement in the operation of closing the breech, means for automatically stopping the swinging movement of the rear barrel when the front and rear barrels are in axial alinement in the operation of closing the breech, and means for automatically locking the operating shaft against rotation until the screw threads of the two barrels are completely disengaged in the operation of opening the breech, comprising a slotted collar fast on said operating shaft, and a spring impressed bell crank lever pivoted to the front barrel and having a pawl arm adapted to project into said slot and lock said collar against turning, and a releasing arm adapted to engage the rear barrel of the gun when the two barrels are in alinement, and the screw threads disengaged.

15. In a non recoil gun of the character described, the combination with a trunnion band, and a forward barrel held therein, said forward barrel being provided with segmental screw threads thereon, of a rear barrel having segmental screw threads engaging the segmental screw threads on the forward barrel, a main operating shaft journaled in bearings carried by said forward barrel, guide bands loosely fitting said rear barrel and secured fast to said operating shaft, means for turning said rear barrel in said guide bands about its axis for locking and unlocking said coacting screw threads, and for swinging said operating shaft and with it said rear barrel to clear said front barrel, means for automatically holding the rear barrel against rotation in the guide bands while the breech is open, and until the screw threads are in alinement in the operation of closing the breech, a cam carried by said operating shaft provided with a shoulder adapted to engage the forward barrel of the gun for automatically stopping the swinging movement of the rear barrel when the front and rear barrels are in axial alinement in the operation of closing the breech, and means for automatically locking the operating shaft against rotation until the screw threads of the two barrels are completely disengaged in the operation of opening the breech, comprising a slotted collar fast on said operating shaft, and a spring impressed bell crank lever pivoted to the front barrel and having a pawl arm adapted to project into said slot and lock said collar against turning, and a releasing arm adapted to engage the rear barrel of the gun when the two barrels are in alinement, and the screw threads disengaged.

16. In a non recoil gun of the character described, the combination with a trunnion band, and a forward barrel held therein, said forward barrel being provided with segmental screw threads thereon, of a rear barrel having segmental screw threads engaging the segmental screw threads on the forward barrel, a main operating shaft journaled in bearings carried by said forward barrel, guide bands loosely fitting said rear barrel and secured fast to said operating shaft, means for turning said rear barrel in said guide bands about its axis for locking and unlocking said coacting screw threads, and for swinging said operating shaft and with it said rear barrel to clear said front barrel, a spring impressed dog provided with a tripping arm for automatically holding the rear barrel against rotation in the guide bands while the breech is open, and until the screw threads are in alinement in the operation of closing the breech, and means for automatically locking the operating shaft against rotation until the screw threads of the two barrels are completely disengaged in the operation of opening the breech.

17. In a non recoil gun of the character described, the combination with a trunnion band, and a forward barrel held therein, said forward barrel being provided with segmental screw threads thereon, of a rear barrel having segmental screw threads engaging the segmental screw threads on the forward barrel, a main operating shaft journaled in bearings carried by said forward barrel, guide bands loosely fitting said rear barrel and secured fast to said operating shaft, means for turning said rear barrel in said guide bands about its axis for locking and unlocking said coacting screw threads, and for swinging said operating shaft and with it said rear barrel to clear said front barrel, means for automatically holding the rear barrel against rotation in the guide bands while the breech is open, and until the screw threads are in alinement in the operation of closing the breech, and means for automatically locking the operating shaft against rotation until the screw threads of the two barrels are completely disengaged in the operation of opening the breech, comprising a slotted collar fast on said operating shaft, and a spring impressed bell crank lever pivoted to the front barrel and having a pawl arm adapted to project into said slot and lock said collar against turning, and a releasing arm adapted to engage the rear barrel of the gun when the two barrels are in alinement, and the screw threads disengaged.

18. In a non recoil gun of the character described, the combination with a trunnion band, and a forward barrel held therein, said forward barrel being provided with segmental screw threads thereon, of a rear barrel having segmental screw threads engaging the segmental screw threads on the forward barrel, a main operating shaft journaled in bearings carried by said forward barrel, guide bands loosely fitting said rear barrel and secured fast to said operating shaft, means for turning said rear barrel in said guide bands about its axis for locking and unlocking said coacting screw threads, and for swinging said operating shaft and with it said rear barrel to clear said front barrel, a spring impressed dog provided with a tripping arm for automatically holding the rear barrel against rotation in the guide bands while the breech is open, and until the screw threads are in alinement in the operation of closing the breech, and means for automatically locking the operating shaft against rotation until the screw threads of the two barrels are completely disengaged in the operation of opening the breech, comprising a slotted collar fast on said operating shaft, and a spring impressed bell crank lever pivoted to the front barrel and having a pawl arm adapted to project into said slot and lock said collar against turning, and a releasing arm adapted to engage the rear barrel of the gun when the two barrels are in alinement and the screw threads disengaged.

19. In a non recoil gun of the character described, the combination with a trunnion band, and a forward barrel held therein, said forward barrel being provided with segmental screw threads on the exterior of its rear end and with a rearwardly projecting segment having internal segmental screw threads therein, of a rear barrel having external segmental screw threads engaging said internal screw threads on the rearwardly projecting segment of the forward barrel, and having a forwardly projecting segment provided with internal segmental screw threads engaging the external segmental screw threads on the forward barrel, a main operating shaft journaled in bearings carried by said forward barrel and located at one side of and below said forward barrel, guide bands loosely fitting said rear barrel and secured fast to said operating shaft, with a handle for turning said rear barrel in said guide bands about its axis for locking and unlocking said coacting screw threads, and for swinging said operating shaft and with it said rear barrel to clear said front barrel, and firing mechanism mounted beneath the gun and automatically cocked by the turning of said operating shaft, substantially as described.

20. In a non recoil gun of the character described, the combination with a trunnion band, and a forward barrel held therein, said forward barrel being provided with segmental screw threads on the exterior of its rear end and with a rearwardly projecting segment having internal segmental screw threads therein, of a rear barrel having external segmental screw threads engaging said internal screw threads on the rearwardly projecting segment of the forward barrel, and having a forwardly projecting segment provided with internal segmental screw threads engaging the external segmental screw threads on the forward barrel, a main operating shaft journaled in bearings carried by said forward barrel and located at one side of and below said forward barrel, guide bands loosely fitting said rear barrel and secured fast to said operating shaft, one of said guide bands being provided with a cam slot corresponding to the pitch of said screw threads, with a handle secured to said rear barrel and engaging in said cam slot for turning said rear barrel in said guide bands about its axis for locking and unlocking said coacting screw threads, and for swinging said operating shaft and with it said rear barrel to clear said front barrel, and firing mechanism mounted beneath the gun and automatically cocked by the turning of said operating shaft, substantially as described.

21. In a non recoil gun of the character described, the combination with a trunnion band, and a forward barrel held therein, said forward barrel being provided with segmental screw threads thereon, of a rear barrel having segmental screw threads engaging the segmental screw threads on the forward barrel, a main operating shaft journaled in bearings carried by said forward barrel and located at one side of and below said forward barrel, guide bands loosely fitting said rear barrel and secured fast to said operating shaft, one of said guide bands being provided with a cam slot corresponding to the pitch of said screw threads, with a handle secured to said rear barrel and engaging in said cam slot for turning said rear barrel in said guide bands about its axis for locking and unlocking said coacting screw threads, and for swinging said operating shaft and with it said rear barrel to clear said front barrel, and firing mechanism mounted beneath the gun and automatically cocked by the turning of said operating shaft, substantially as described.

22. In a non recoil gun of the character described, the combination with a trunnion band, and a forward barrel held therein, said forward barrel being provided with segmental screw threads thereon, of a rear barrel having segmental screw threads engaging the segmental screw threads on the forward barrel, a main operating shaft journaled in bearings carried by said forward barrel and located at one side of and below said forward barrel, guide bands loosely fitting said rear barrel and secured fast to said operating shaft, a handle secured to said rear barrel for turning said rear barrel in said guide bands about its axis and for turning said operating shaft, and firing mechanism mounted beneath the gun and automatically cocked by the turning of said operating shaft, substantially as described.

23. In a non recoil gun of the character described, the combination with a trunnion band, and a forward barrel held therein, said forward barrel being provided with segmental screw threads thereon, of a rear barrel having segmental screw threads engaging the segmental screw threads on the forward barrel, a main operating shaft journaled in bearings carried by said forward barrel and located at one side of and below said forward barrel, and means for turning said operating shaft and for moving said rear barrel from the locked to the open position, or vice versa, firing mechanism cocked by the rotation of said operating shaft, a trigger and mechanism operated thereby for releasing said firing mechanism, and a firing pin mounted transversely of the forward gun barrel and actuated by said firing mechanism, with a spring normally withdrawing the point of said firing pin within the walls of said gun barrel, substantially as described.

24. In a gun of the character described, the combination with a front barrel, an operating shaft rotatably connected thereto, a rear barrel supported on said operating shaft, means for rotating said shaft and for moving said rear barrel from the open to the closed position and vice versa, a firing pin mounted transversely in said forward barrel, with a spring normally withdrawing the point of said firing pin within the walls of said barrel, a rotary hammer with means for cocking same automatically operated by the rotation of said operating shaft, and trigger mechanism carried by said operating shaft for releasing said hammer, substantially as described.

25. In a gun of the character described, the combination with a front barrel, an operating shaft rotatably connected thereto, a rear barrel supported on said operating shaft, means for rotating said shaft and for moving said rear barrel from the open to the closed position and vice versa, a firing pin mounted transversely in said forward barrel, with a spring normally withdrawing the point of said firing pin within the walls of said barrel, a rotary hammer with means for cocking same automatically operated by the rotation of said operating shaft, and trigger mechanism carried by said operating shaft for releasing said hammer, a safety stop automatically released when the rear barrel is brought to the closed and locked position, and means controlled by said safety stop for preventing the rotation of said hammer except when said safety stop is released, substantially as described.

26. In a gun of the character described, the combination with a front barrel, a hollow operating shaft rotatably connected thereto, a rear barrel supported on said operating shaft, means for rotating said shaft and for moving said rear barrel from the open to the closed position and vice versa, a firing pin mounted transversely in said forward barrel, with a spring normally withdrawing the point of said firing pin within the walls of said barrel, a spindle journaled in said hollow operating shaft, a coil spring under torsion normally tending both to twist said spindle, and to draw the same rearward, a rotary hammer carried by said spindle and registering with the head of said firing pin when said spindle is moved to the forward position, and trigger mechanism is carried by said operating shaft and adapted to automatically lock said spindle against the torsion of said spring but to press forward said spindle and simultaneously release same to the rotary action of said spring when the trigger is pulled, substantially as described.

27. In a gun of the character described, the combination with a front barrel, a hollow operating shaft rotatably connected thereto, a rear barrel supported on said operating shaft, means for rotating said shaft and for moving said rear barrel from the open to the closed position and vice versa, a firing pin mounted transversely in said forward barrel, with a spring normally withdrawing the point of said firing pin within the walls of said barrel, a spindle journaled in said hollow operating shaft, a coil spring under torsion normally tending both to twist said spindle, and to draw the same rearward, a rotary hammer carried by said spindle and registering with the head of said firing pin when said spindle is moved to the forward position, and trigger mechanism carried by said operating shaft and adapted to automatically lock said spindle against the torsion of said spring but to press forward said spindle and simultaneously release same to the rotary action of said spring when the trigger is pulled, a rod connected to said spindle and projecting rearward in said hollow shaft, a head at the rear end of said rod, and a stop normally engaging said head and locking said spindle against forward movement except when the rear barrel is interlocked with the front barrel, substantially as described.

28. In a gun of the character described, the combination with a front barrel, a hollow operating shaft rotatably connected thereto, a rear barrel supported on said operating shaft, means for rotating said shaft and for moving said rear barrel from the open to the closed position and vica versa, a firing pin mounted transversely in said forward barrel, with a spring normally withdrawing the point of said firing pin within the walls of said barrel, a spindle journaled in said hollow operating shaft, a coil spring under torsion normally tending both to twist said spindle and to draw the same rearward, a rotary hammer carried by said spindle and registering with the head of said firing pin when said spindle is moved to the forward position, and trigger mechanism carried by said operating shaft and adapted to automatically lock said spindle against the torsion of said spring but to press forward said spindle and simultaneously release same to the rotary action of said spring when the trigger is pulled, a rod connected to said spindle and projecting rearward in said hollow shaft, a head at the rear end of said rod, and a stop pin normally pressed outward by contact with the rear barrel into engagement with said head, and a spring normally pressing said pin inward, and causing it to project into a notch in the rear barrel and to release said head when the rear barrel is in the closed and locked position, substantially as described.

29. In a gun of the character described, the combination with a front barrel, a hollow operating shaft rotatably connected thereto, a rear barrel supported on said operating shaft, means for rotating said shaft and for moving said rear barrel from the open to the closed position and vice versa, a firing pin mounted transversely in said forward barrel, with a spring normally withdrawing the point of said firing pin within the walls of said barrel, a spindle journaled in said hollow operating shaft, the heel of said spindle being provided with an axially disposed notch, a coil spring under torsion normally tending both to twist said spindle and to draw the same rearward, a rotary hammer carried by said spindle and registering with the head of said firing pin when said spindle is moved to the forward position, a trigger guard fast to said operating shaft, a trigger shaft journaled in said trigger guard, a trigger fast on said trigger shaft and provided with an upwardly projecting arm engaging said spindle, a spring impressed sear also fast on said trigger shaft and normally pressed into engagement with said notch, and thereby holding said spindle against rotation but releasing same when the trigger is pulled, substantially as described.

30. In a gun of the character described, the combination with a front barrel, a hollow operating shaft rotatably connected thereto, a rear barrel supported on said operating shaft, means for rotating said shaft and for moving said rear barrel from the open to the closed position and vice versa, a firing pin mounted transversely in said forward barrel, with a spring normally withdrawing the point of said firing pin within the walls of said barrel, a spindle journaled in said hollow operating shaft, the heel of said spindle being provided with an axially disposed notch, a coil spring under torsion normally tending both to twist said spindle and to draw the same rearward, a rotary hammer carried by said spindle and registering with the head of said firing pin when said spindle is moved to the forward position, a trigger guard fast to said operating shaft, a trigger shaft journaled in said trigger guard, a trigger fast on said trigger shaft and provided with an upwardly projecting arm engaging said spindle, a spring impressed sear also fast on said trigger shaft and normally pressed into engagement with said notch, and thereby holding said spindle against rotation but releasing same when the trigger is pulled, a rod connected to said spindle and projecting rearward in said hollow shaft, a head at the rear end of said rod, and a stop normally engaging said head and locking said spindle against forward movement except when the rear barrel is interlocked with the front barrel, substantially as described.

31. In a gun of the character described, the combination with a front barrel, a hollow operating shaft rotatably connected thereto, a rear barrel supported on said operating shaft, means for rotating said shaft and for moving said rear barrel from the open to the closed position and vice versa, a firing pin mounted transversely in said forward barrel, with a spring normally withdrawing the point of said firing pin within the walls of said barrel, a spindle journaled in said hollow operating shaft, the heel of said spindle being provided with an axially disposed notch, a coil spring under torsion normally tending both to twist said spindle and to draw the same rearward, a rotary hammer carried by said spindle and registering with the head of said firing pin when said spindle is moved to the forward position, a trigger guard fast to said operating shaft, a trigger shaft journaled in said trigger guard, a trigger fast on said trigger shaft and provided with an upwardly projecting arm engaging said spindle, a spring impressed sear also fast on said trigger shaft and normally pressed into engagement with said notch, and thereby holding said spindle against rotation but releasing same when the trigger is pulled, a rod connected to said spindle and projecting rearward in said hollow shaft, a head at the rear end of said rod, a stop pin normally pressed outward by contact with the rear barrel into engagement with said head, and a spring normally pressing said pin inward, and causing it to project into a notch in the rear barrel and to release said head when the rear barrel is in the closed and locked position, substantially as described.

In testimony whereof, I affix my signature.

JULIAN A. GILES.